1

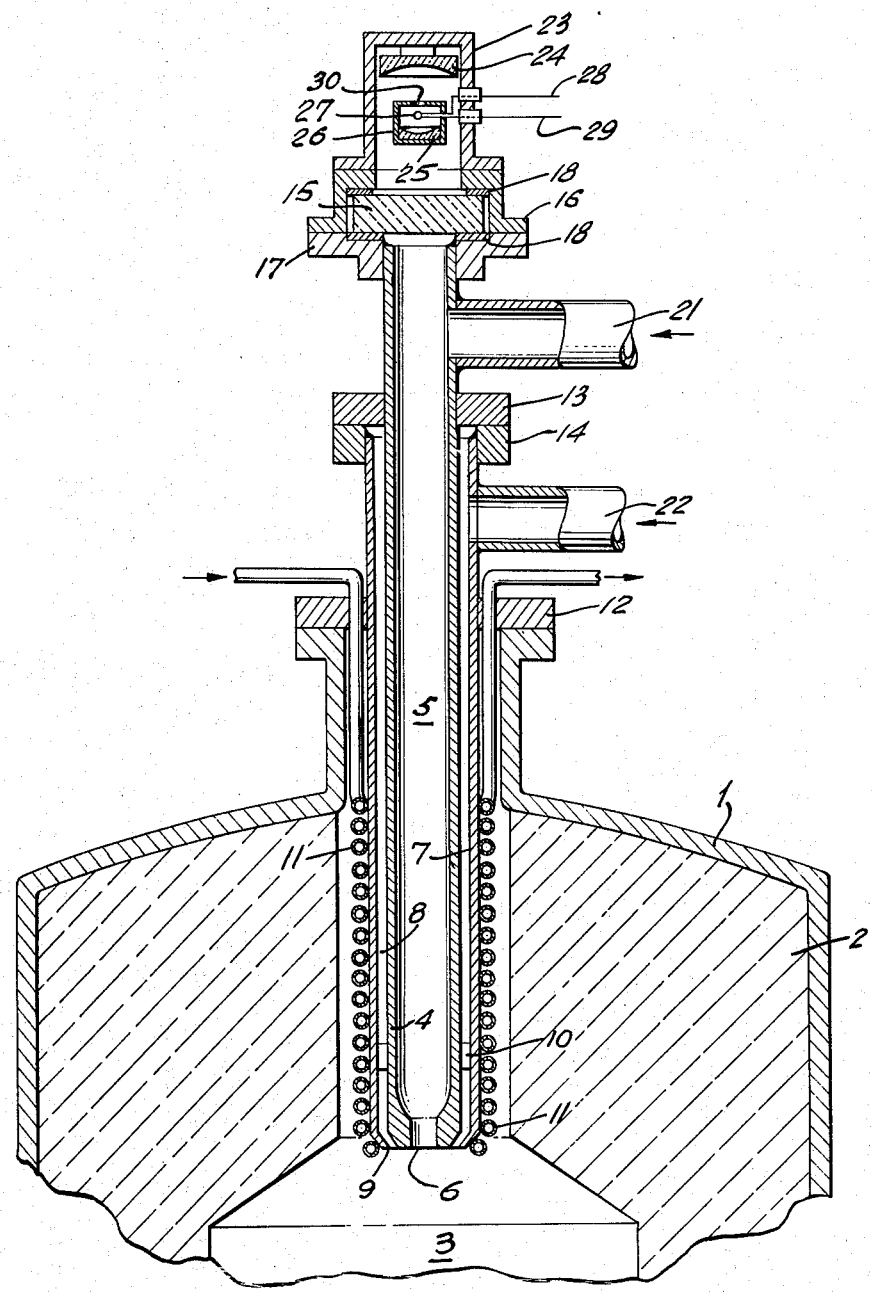

2,963,353

TEMPERATURE MEASUREMENT IN REACTORS OPERATING UNDER HIGH TEMPERATURE AND PRESSURE

Du Bois Eastman, Whittier, Calif., assignor to Texaco Inc., a corporation of Delaware Filed June 20, 1957, Ser. No. 666,914

4 Claims. (Cl. 48—196)

The present invention relates to measurement of temperature in reactors employed in the generation of carbon monoxide and hydrogen from hydrocarbons. In one of its more specific aspects, the present invention relates to a method of and apparatus for determining temperature changes in a reaction zone wherein hydrocarbons are converted by partial oxidation at elevated temperature and pressure to carbon monoxide and hydrogen.

The partial oxidation of hydrocarbonaceous fuels by direct reaction with free oxygen, optionally with added steam, in an unpacked reaction zone has recently been developed commercially. The reaction is carried out in a compact reaction zone autogenously maintained at a temperature in the range of 2000°F. to 3000°F. and a pressure in the range of 100 to 600 p.s.i.g. The mean temperature within the reaction zone generally is preferably in the range of 2200 to 2600° F. Although higher temperatures are permissible, they are generally less desirable as the oxygen requirements increase with an increase in temperature. The maximum temperature is limited by the inherent limitations of available refractories. To make the most efficient use of the oxygen and fuel and to prevent overheating of the refractory, it is important that the temperature within the reaction zone be carefully controlled.

Heretofore, thermocouples encased in protective sheaths have been employed to determine the temperature prevailing within the reaction zone. Due to the fact that hydrogen at elevated temperature and pressure is very mobile and highly reactive, difficulty has been experienced in maintaining thermocouples within the reaction zone. Refractory sheaths capable of withstanding the high temperatures are fragile and subject to breakage by expansion and contraction of the refractory lining of the reactor vessel.

Previous attempts to monitor the reaction temperature by means of radiation detectors responsive to thermal radiation has been unsuccessful primarily due to inability to maintain a clear passage or pathway for transmission of radiation from the reaction zone to an externally placed detector. A problem encountered in previous applications of both radiant energy detectors and shielded thermocouples is the masking effect on the temperature measuring device due to by-product carbon formed in the reaction. This carbon collects on the thermocouple sheath or along the radiation path resulting in inaccurate temperature indications. Another serious obstacle to attempts to measure reaction temperature by means of radiation instruments has been the problem of shifting of refractory lining in the reaction vessel due to expansion and contraction with heating and cooling. The shift in refractory results in interference with the transmission of radiant energy from the interior of the reaction zone to an externally placed detector. In some cases, the provision of openings in the refractory lining results in excessive heat leakage to the shell of the reaction vessel causing localized overheating of the shell.

The present invention is directed to an improved

2 method of obtaining temperature indications by radiation from a high temperature reaction zone to an externally located radiation detector. The present invention further provides novel apparatus which effects mixing of the reactants supplied to the reaction zone and at the same time permits unobstructed radiation from the reaction zone to a radiation detector incorporated in the mixer burner. The advantages of this ingenious burner-detector apparatus will be evident from the following detailed description thereof.

With reference to the drawing, the numeral 1 designates the shell of a reactor vessel designed for partial oxidation of hydrocarbons to carbon monoxide and hydrogen. The shell 1 is provided with a refractory lining 2 which protects the walls of the vessel from overheating and defines an unpacked reaction space 3 in which the mixture of reactants is converted into the desired reaction products.

For the purpose of illustration, the burner is described in connection with the generation of hydrogen and carbon monoxide by reaction between oxygen and gasiform hydrocarbon. The burner comprises an inner conduit 4 having a straight, uninterrupted passageway 5 for the introduction of one of the reactants, which provides an unobstructed pathway for the transmission of radiation from the reaction chamber to a detector as described hereinafter.

The central passageway 5 preferably terminates in a discharge orifice 6 of reduced cross-sectional area which provides increased velocity of flow of the centrally introduced reactant at its point of discharge into the reaction zone. Preferably the cross-sectional area of the discharge port is such that the velocity of the centrally introduced reactant at the point of discharge is at least double its velocity in passageway 5, ensuring a high velocity and a very short contact time between the metal and oxygen at the burner tip. The second reactant is introduced through concentric, annularly-spaced outer conduit 7 forming an annular passageway 8 for the introduction of the second reactant. Preferably the configuration of conduit 7 at the burner tip is such that the reactant stream in the annular passageway 8 discharged through annular port 9 is directed directly into the stream discharged from port 6 to ensure immediate and complete mixing of the reactant streams.

A cooling coil 11 surrounds outer conduit 7 to protect the burner from the high temperature prevailing in reaction chamber 3. Flange 12 attached to outer conduit 7 holds the burner in position in the reaction vessel. A pair of flanges 13 and 14, attached to conduits 4 and 7, respectively, position conduit 4 relative to conduit 7 and close the annular passageway 8 at the end opposite port 9. Spacers 10 ensure that conduit 7 is uniformly spaced from conduit 4 and that ports 6 and 9 are concentric with the result that there is an even distribution of gas in annular port 9.

Central passageway 6 is closed at its end opposite port 6 by pressure-resistant disc 15, suitably of Pyrex glass, transparent to at least a portion of the radiant energy from the reaction zone, and secured in position by flanged members 16 and 17. A pressure-tight seal between disc 15 and flanged members 16 and 17 is provided by gaskets 18, suitably of asbestos.

Conduit 21 connected with conduit 4 supplies one of the reactant streams to central passageway 5. Similarly, conduit 22 connected with conduit 7 supplies a second reactant stream to the annular passageway 8. In operation, a gaseous or vaporiform reactant, transparent to at least a portion of the radiation from the reaction zone, is introduced through line 21 to central passageway 5 from which it is discharged through port 6 into the reaction zone. A second fluent stream comprising one or more reactants is introduced through conduit 22 into annular passageway 8 and is discharged through port 9 as an annular stream into admixture with the stream discharged centrally through port 6 from passageway 5.

A radiation detector is positioned adjacent disc 15 to receive and detect radiant energy from the reaction zone. One particular type radiation detector which is suitable for this purpose is illustrated in the drawing and described herein. The detector illustrated in the figure comprises a protective housing 23 adapted for mounting on the burner assembly in a position to receive radiation transmitted through passageway 5 and disc 15. The detector comprises a concave mirror 24 positioned in the housing opposite disc 15. Within housing 23 intermediate disc 15 and mirror 24 is a similar but smaller, oppositely-faced, concave mirror 25 enclosed within an inner shell 26. Also contained within inner shell 26 at approximately the focal point of mirror 25 is a blackened thermopile 27. Electrical leads 28 and 29 from the thermopile extend through the wall of housing 23.

In operation, radiant energy from reaction zone 3 passes through port 6 and is transmitted through passageway 5 and disc 15 to the radiation detector. At least a portion of the radiation entering the detector housing through disc 15 is picked up by concave mirror 24 and reflected through window 30 in inner shell 26. Mirror 25 focuses the radiation on thermopile junctions 27 resulting in the generation of an electrical potential difference between leads 28 and 29. Variations in temperature within reactor 3 result in variations in intensity of radiation transmitted to the detector causing variations in the electrical potential generated in thermopile 27. Electrical energy from thermopile 27 may be transmitted by leads 28 and 29 to a suitable indicating device, not illustrated in the drawing. Since these variations in electrical potential are indicative of temperature variations within the reaction zone, it is possible to determine with a fair degree of accuracy, during operation of the reactor under pressure, the temperature level at a point within the reactor. The present invention thus provides a method and apparatus capable of providing continuous information as to temperature variations at a control point, namely at the point of mixing and combustion of the reactants, within the reaction zone during operation.

Obviously, many modifications and variations of the invention, as hereinbefore set forth, may be made without departing from the spirit and scope thereof, and therefore only such limitations should be imposed as are indicated in the appended claims.

I claim:

1. In a burner assembly associated with a reaction zone for admixing a hydrocarbonaceous fuel with an oxygen-containing gas to form a flame comprising inner and outer conduits disposed coaxially one about the other, said inner conduit defining a straight uninterrupted passageway of substantially uniform cross section having a discharge port at one end thereof and said outer conduit defining an annular passageway terminating in an annular discharge port adjacent said discharge port of said inner conduit, the improvement which comprises a temperature measuring device comprising radiant heat detector at the opposite end of said inner conduit from said discharge port arranged to receive radiant heat energy from the interior of said flame through said inner conduit, means for the introduction of gaseous reactant transparent to said radiation into said inner conduit adjacent said detector and for discharging said reactant gas from said inner conduit through said first-mentioned discharge port into said reaction zone and means for the introduction of a second reactant into said annular passageway whereby a stream of said second reactant is discharged from said annular discharge port into said reaction zone into admixture with said gas from said first-mentioned discharge port forming a flame and transmitting radiation directly from the interior of said flame through said inner conduit to said detector.

2. Apparatus according to claim 1 wherein said first-mentioned discharge port is of smaller diameter than said passageway of said inner conduit.

3. Apparatus as defined in claim 1 comprising a cooling coil surrounding said outer conduit.

4. In apparatus for the generation of synthesis gas consisting essentially of carbon monoxide and hydrogen comprising a refractory lined, pressure-resistant reactor vessel defining a vertical cylindrical reaction chamber, and a burner assembly comprising inner and outer conduits disposed coaxially one about the other, said inner conduit defining a straight uninterrupted passageway of substantially uniform cross section having a discharge port at one end thereof and said outer conduit defining an annular passageway terminating in an annular discharge port adjacent said discharge port of said inner conduit and arranged to direct gases from said annular passageway into intersecting relationship with gas discharged from said first-mentioned discharge port to form a flame, the improvement comprising, in combination with said burner assembly, a temperature measuring device comprising a radiant heat detector at the opposite end of said inner conduit from said discharge port arranged to receive radiant heat energy from the interior of said flame through said inner conduit, and axially arranged with respect to said reaction chamber at the upper end thereof, means for introduction of gaseous reactant transparent to radiant heat energy into said inner conduit adjacent said detector whereby a stream of said gaseous reactant is discharged through said first-mentioned discharge port axially and downwardly into said reaction zone, means for introduction of a second reactant into said outer conduit whereby said second reactant is discharged from said annular discharge port into admixture with said gas from said first-mentioned discharge port forming a flame and transmitting radiant heat energy directly from the interior of said flame through said inner conduit to said radiant heat detector.

References Cited in the file of this patent

UNITED STATES PATENTS

| | | |
|---|---|---|
| 1,745,178 | McCabe | Jan. 28, 1930 |
| 1,755,970 | Singleton | Apr. 22, 1930 |
| 2,265,904 | Herr | Dec. 9, 1941 |
| 2,448,199 | Vollrath | Aug. 31, 1948 |
| 2,767,785 | Eastman et al. | Oct. 23, 1956 |
| 2,772,729 | Mayhew | Dec. 4, 1956 |
| 2,838,105 | Eastman et al. | June 10, 1958 |